Nov. 1, 1960 R. BIRD ET AL 2,958,856

MAGNETIC DATA STORAGE SYSTEMS

Filed Dec. 1, 1954

INVENTORS
RAYMOND BIRD
JOHN ROBERT CARTWRIGHT
BY Frederick E. Kane
ATTORNEY

United States Patent Office 2,958,856

Patented Nov. 1, 1960

2,958,856

MAGNETIC DATA STORAGE SYSTEMS

Raymond Bird and John Robert Cartwright, Letchworth, England, assignors to International Computers and Tabulators Limited, London, England, a British company Filed Dec. 1, 1954, Ser. No. 472,453

Claims priority, application Great Britain Dec. 18, 1953

2 Claims. (Cl. 340—174.1)

This invention relates to data storage systems using a rotating member, such as a drum or disc, which has a magnetisable surface.

It is well known to employ a magnetic drum or disc for data storage in computing machines and similar applications. The data is recorded in a plurality of tracks around the periphery, each track containing several "words" or items of data. A clock track is usually provided to generate timing signals corresponding to each pulse position of each word, for gating signals for both reading and writing on the drum. In order to select a particular position on the drum for reading or writing, it has been the practice to use a combination of space selection and time selection. The space selection consists in selecting the head associated with the track containing the particular word position. This selection may be performed by a switching network of relay contacts or valves alone, or such a network acting in conjunction with a physical movement of a limited number of heads. The time selection is performed by making the selected head operative to read or write, as the case may be, at some selected interval after a reference point on the drum passes the selected head. This has been done, for example, by providing an end of revolution pulse and an end of word pulse, counting the end of word pulses and determining coincidence between the counter and the number of the particular word position.

It is the object of the present invention to provide a simplified method for the selection of a desired word position on a magnetic drum or disc storage device, having a plurality of tracks, each containing a plurality of words.

According to the invention data storage apparatus has a rotatable member on the surface of which data may be recorded magnetically, there being a plurality of data tracks, each of which comprises a plurality of data word positions, switching means for rendering a magnetic reading head operative to read out data recorded in a selected track, means for producing a plurality of clock pulse trains, one for each data word position, means for selecting one of the clock pulse trains, and gating means controlled jointly by the output due to data recorded in the selected data track and by the selected clock pulse train, to provide an output corresponding to data recorded in a pre-determined word position of the selected data track.

Each clock pulse train may be produced by a separate clock track and reading head, or alternatively, a plurality of reading heads may be provided for a, or each, clock track. In a further form of the invention, a plurality of reading heads may be provided for a single clock, the reading heads being used in combination to provide the required clock pulse trains.

The invention will now be described by way of example, with reference to the accompanying drawings, in which.

Figures 1, 1A, 2, 2A, 3, 3A:
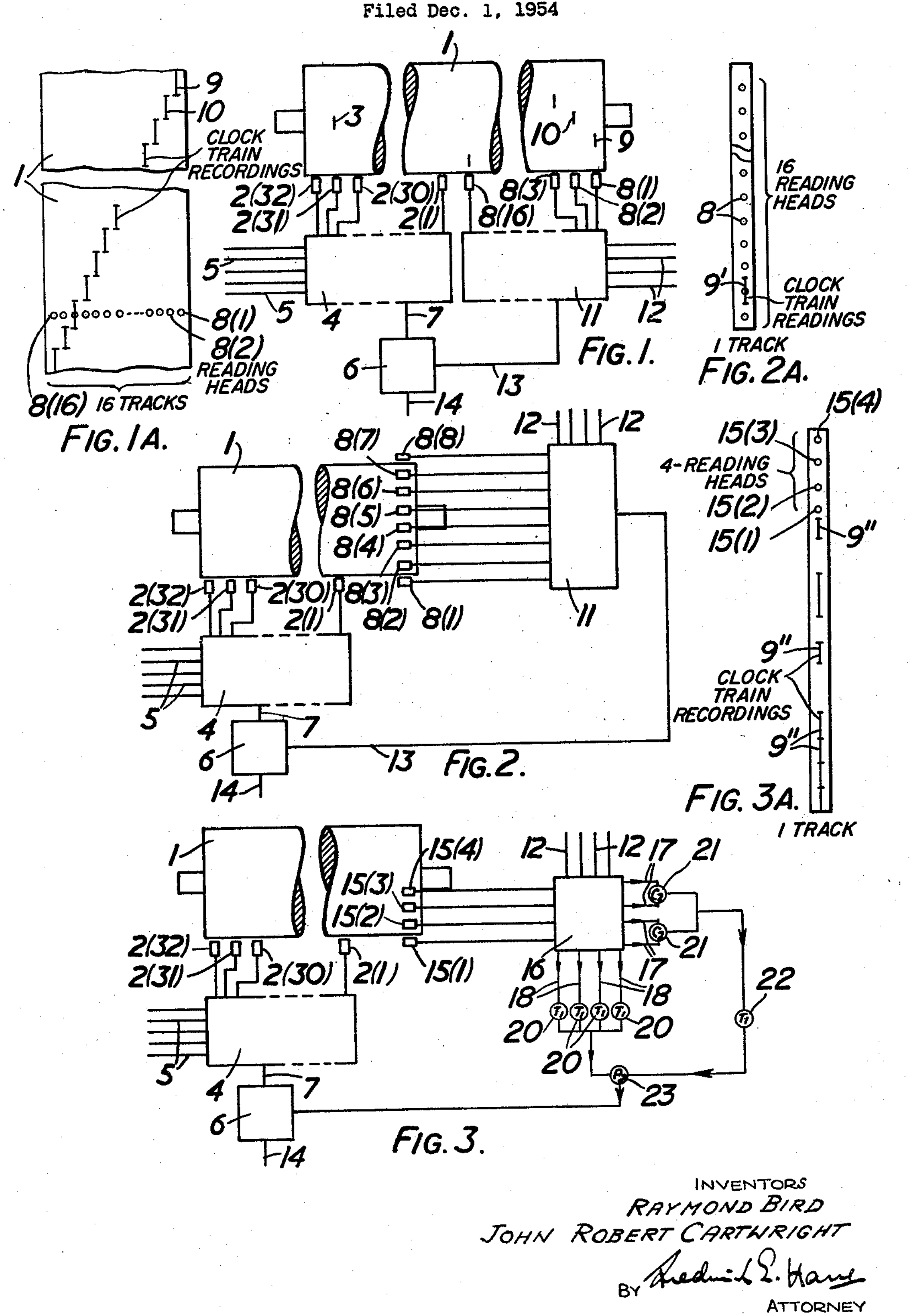
Figure 1 is a block diagram of one form of the invention.
Figure 2 is a block diagram of a modification of Figure 1.
Figure 3 is a block diagram of a second form of the invention.
Figures 1A, 2A and 3A are developments illustrating the clock track or tracks of the embodiments shown in Figures 1, 2 and 3 respectively.

By way of illustration, it will be assumed that it is required to read out a selected word from data already recorded on a magnetic storage drum 1 (Figure 1). There are thirty-two tracks from which data may be read by thirty-two reading heads 2(1) to 2(32), of which four heads are shown. Each track can contain sixteen words, each of which has thirty-two binary digits.

The word to be selected is the second word, from a given reference mark on the drum 1, which is recorded in track 31. The first space selection is, therefore, that of selecting the head 2(31). This is effected by a switching matrix 4 which connects the head to a single output line 7. The switching matrix is controlled by five lines 5 which are energised singly or in combination to select any one of the thirty-two heads. The matrix may consist of a network of the contacts of relays controlled by the lines 5 or of diodes or multi-electrode valves, according to other circuit requirements, such as the maximum speed at which the matrix has to be switched. Switching matrices of this general type are well known, and are described for example in a paper entitled "Rectifier Networks for Multiposition Switching" by D. R. Brown and N. Rochester appearing at pages 139 to 147 of vol. 37, No. 2 of Proc. I.R.E. (February 1949).

There are also sixteen clock tracks on the drum 1, which are sensed by reading heads 8(1) to 8(16), of which four heads are shown. The first track, which is sensed by the head 8(1), has thirty-two pulses recorded in the position corresponding to that of the first word in the data tracks, as indicated by the mark 9. The second track has thirty-two pulses in the position corresponding to the second word of the data tracks, as indicated by the mark 10. The other clock tracks are similarly arranged, each track having a single word of thirty-two pulses recorded at a word position on the track corresponding to the number of the track. These clock tracks may be engraved on the surface of the drum 1, or they may be recorded initially by suitably pulsing the clock pulse reading heads.

The second space selection is made by selecting the clock pulse reading head for the track which has the same number as the data word to be read out. In the present example, the second word of track thirty-one is required, so that the head 8(2) is selected. The selection of the head 8(2) is performed by a matrix 11, which is similar to the matrix 4, except that it has to deal with only sixteen inputs and therefore has four control lines 12.

The signals picked up by the head 8(2) appear on an output line 13 of the matrix 11 and are fed together with the output from the head 2(31) on the line 7 to a conventional amplifying and gating circuit 6, such as one such circuit described at pages 37 to 40 of "High Speed Computing Devices" published by the McGraw-Hill Book Company in 1950. The circuit 6 provides an output on a line 14 only when pulses occur on both the lines 7 and 13. Thus, although data may be recorded in all sixteen word positions of track thirty-one, there will only be pulses on the line 13 when the head 8(2)

reads the word 10, that is, when the head 2(31) is reading the word 3 and accordingly only the word 3 will appear on the output line 14. As long as the potentials of the control lines 5 and 12 are unchanged, the word 3 will be read out on the line 14 once for each revolution of the drum 1.

The drum 1 may well have many more than thirty-two data tracks recorded thereon and in this case, the requirements of sixteen clock tracks will not increase seriously the size of the drum. This arrangement has the advantage that both the data heads 2 and the clock track heads 8 may be carried by a single mounting bar running parallel axially to the drum surface, which simplifies the mechanical construction. The modified form shown in Figure 2 is preferable when the size of the drum 1 must be held to a minimum, even at the expense of some complexity in the mechanical construction. Similar parts in Figures 1, 2 and 3 are given the same references.

In the modified form of the invention shown in Figure 2, a single clock track only is used and the sixteen clock track heads 8 are arranged adjacent to this track circumferentially around the drum 1, the heads being spaced at one word intervals. A single group 9′ of thirty-two pulses is recorded on the clock track at such a position that it is being read by the head 8(1) at the same time as the first word of each data track is being read by the corresponding head 2. Consequently, if the matrices 4 and 11 are set up as before, the clock track word will be read by the head 8(2) at the same time as the second word on track thirty-one, and therefore this data word will appear on the output line 14.

If the words are very closely spaced along the tracks, it may not be possible to mount the heads 8 sufficiently close together to provide the required one word spacing. In this case two clock tracks may be used, each having one word recorded thereon, and the heads are then mounted so that the heads 8(1), 8(3), 8(5) etc., read one clock track and the heads 8(2), 8(4), 8(6) etc., read the other clock track.

In the form of the invention shown in Figure 3, only a single clock track illustrated in Figure 3*a* is used, and this track is read by four heads 15(1), 15(2), 15(3) and 15(4) arranged circumferentially around the drum 1, with the heads at one word intervals. A pattern of words 9″ is recorded on the clock track such that for each data word position a different combination of clock track heads is reading a word. One example of such a pattern is shown below. An "X" indicating that a word is recorded in that position.

| Data word position | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Clock word | X | X | X | X | ---- | ---- | X | ---- | X | X | ---- | X | ---- | ---- | ---- | ---- |

Using this pattern, the data word positions at which each clock pulse head reads a word is shown below, and it will be seen that a unique combination of heads are utilised for each of the sixteen positions.

| Data word position | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Head 15(1) | X | X | X | X | ---- | ---- | X | ---- | X | X | ---- | X | ---- | ---- | ---- | ---- |
| Head 15(2) | ---- | X | X | X | X | ---- | ---- | X | ---- | X | X | ---- | X | ---- | ---- | ---- |
| Head 15(3) | ---- | ---- | X | X | X | X | ---- | ---- | X | ---- | X | X | ---- | X | ---- | ---- |
| Head 15(4) | ---- | ---- | ---- | X | X | X | X | ---- | ---- | X | ---- | X | X | ---- | X | ---- |

The lines 12 now control a matrix 16 which switches the four heads to one of two sets of output lines 17 and 18, depending upon whether the head is inoperative or operative for the data word position required. The matrix 16 is of known type and is disclosed in the above-mentioned paper "Rectifier Networks for Multiposition Switching." For example, for the ninth word position, the heads 15(1) and 15(3) are connected to the first and third output lines 18 and the heads 15(2) and 15(4) are connected to the second and fourth output lines 17. The lines 17, 18 which are not connected to the heads are connected to a constant voltage. The lines 17, 18 are connected to a circuit, the function of which is to gate to the circuit 6 on line 19 clock pulses only during the word position selected by the setting of matrix 16. This circuit embodies a number of switching elements illustrated on page 12 of "Synthesis of Electronic Computing and Control Circuits" published by Harvard University Press and represented by the same reference letters $T_1$, $C_2$, $P_2$, used on that page. Thus the lines 18 are connected to four $T_1$ switching elements 20 having a common output circuit as illustrated at the sixth line of page 12 of the beforementioned book, and forming a four-input "and" gate. Each element 20 which is not connected to a head by matrix 16 is switched on by the constant voltage. An output pulse will therefore be emitted, when and only when pulses are received simultaneously on the lines 18 which are connected to heads.

The lines 17 are connected in pairs to two two-input gates 21, the outputs from which are commoned and A.C. coupled through an inverter 22 to a two-input "and" gate 23. The output from gate 20 is also applied to gate 23 and the output on gate 23 is applied on line 19 to the device 14.

Inverter 22 normally provides a priming voltage for gate 23 so that if a pulse is emitted by gate 20 there will be an output on line 19. However, the occurrence of a pulse on any line 17 connected by the matrix 16 to a head will cause a pulse to pass to the inverter 22 and will prohibit an output from gate 23. As an example, suppose the matrix 16 is set for the ninth word position; clock pulses will then only be passed by gate 23 when simultaneously there are pulses on the first and third lines 18, so as to operate gate 20, and when there are no pulses on the second and fourth lines 17 so that no pulse is emitted by gates 21. From an examination of the table, it will be seen that these circumstances occur only during the ninth data word position.

The circuit of Figure 3, will not give clock pulses for the sixteenth word position since the table shows that at this position, no heads are connected to lines 18.

If it is essential to use the sixteenth word position, this may be arranged by providing a second clock track having words of thirty-two pulses recorded in all the sixteen positions. The circuit 18 is modified to provide a control voltage except when a head connected to it is inoperative or the circuit 17 is operative. This control voltage is applied to a gate which also receives pulses from the head reading the second clock track. The output of this gate is fed to the circuit 6 instead of the output from the circuit 18.

It will be appreciated that the arrangements described are equally applicable to recording on the drum in a chosen word position if the circuit 6 is modified so that a pulse applied to the line 14 produces an output on the line 7 if this pulse coincides with a clock pulse from the matrix 11 or the circuit 18.

With the arrangement of Figure 3 other patterns of clock pulse words may be used with the heads in the relation shown, and the heads may also be spaced at other multiples of a word interval. The only requirement is that the heads must provide a unique coding of outputs for each data word position which is to be selected.

It will be appreciated that the arrangement of the clock tracks for each form of the invention is dependent solely upon the number of word positions in a data track and the number of digits in each word. Consequently, the clock tracks need not be recorded on the drum itself; instead they may take the form of phonic wheel pulse generators, mounted on the same shaft as the drum, and associated with suitable pick-up or reading heads. Alternatively, a disc with alternate transparent and opaque sections may be mounted on the drum shaft and sensed photo-electrically to produce the required clock pulse trains.

What we claim is:

1. Data storage apparatus comprising a multi-track, multi-word rotatable magnetic storage member having a plurality of data tracks and a plurality of clock tracks, a transducing head for each said data track for serially transducing signals on the respective tracks, track selecting means for rendering operative one of said transducing heads, a read-out head for each said clock track, there being recorded on each of said single clock tracks a single serial clock pulse train staggered in position relative to the clock pulse trains of other clock tracks and corresponding in time position with a different one of the word position, word selecting means for rendering operative one of said read-out heads, gating means for all said transducing heads, and means controlled by clock pulses from the selected read-out head for rendering operative said gating means.

2. A data storage apparatus as claimed in claim 1 in which said track selecting means and said word selecting means each comprise a switching matrix.

References Cited in the file of this patent

UNITED STATES PATENTS

| | | |
|---|---|---|
| 2,540,654 | Cohen et al. | Feb. 16, 1951 |
| 2,587,532 | Schmidt | Feb. 26, 1952 |
| 2,611,813 | Sharpless et al. | Sept. 23, 1952 |
| 2,679,638 | Bensky | May 25, 1954 |
| 2,695,992 | Winger | Nov. 30, 1954 |
| 2,771,595 | Hendrickson et al. | Nov. 20, 1956 |

OTHER REFERENCES

"The Raydac System and Its External Memory," by K. M. Rehler, in Review of Input and Output Equipment, joint AIEE–IRE–ACM Computer Conference, March 1953, pp. 63–68.